S. MARTIN.
Brick-Machine.
No. 168,911.
2 Sheets--Sheet 1.
Patented Oct. 19, 1875.
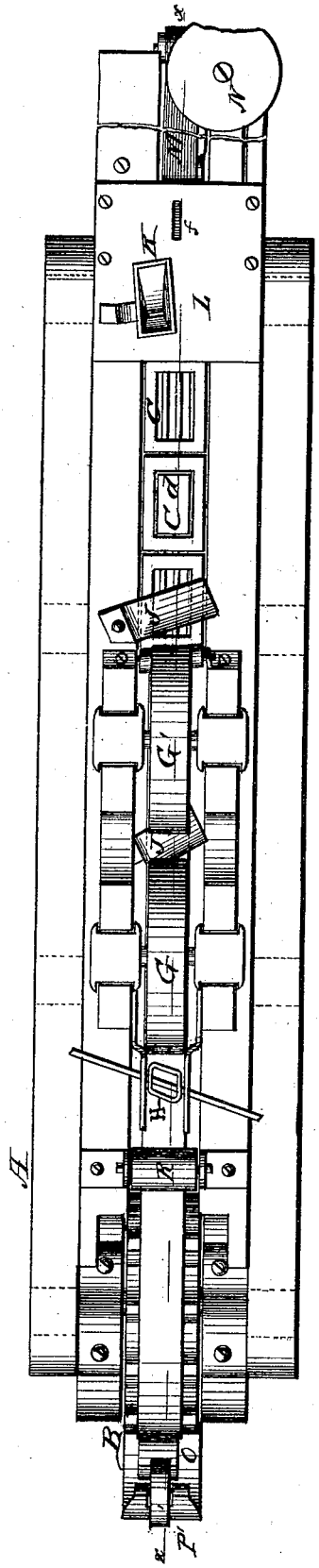
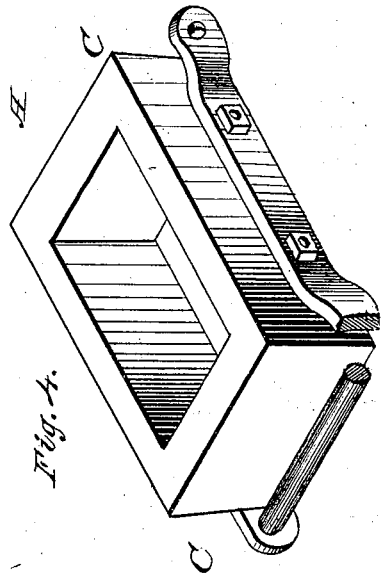
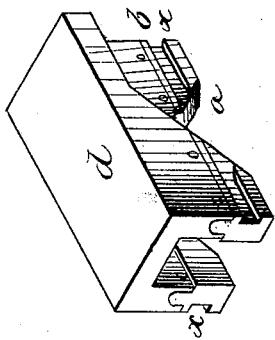
WITNESSES:
P. C. Dieterich
Wm. Kukkerman
INVENTOR:
Sam'l Martin
per
C. H. Watson & Co.
ATTORNEYS S. MARTIN.
Brick-Machine.
No. 168,911.
Patented Oct. 19, 1875.
2 Sheets--Sheet 2.
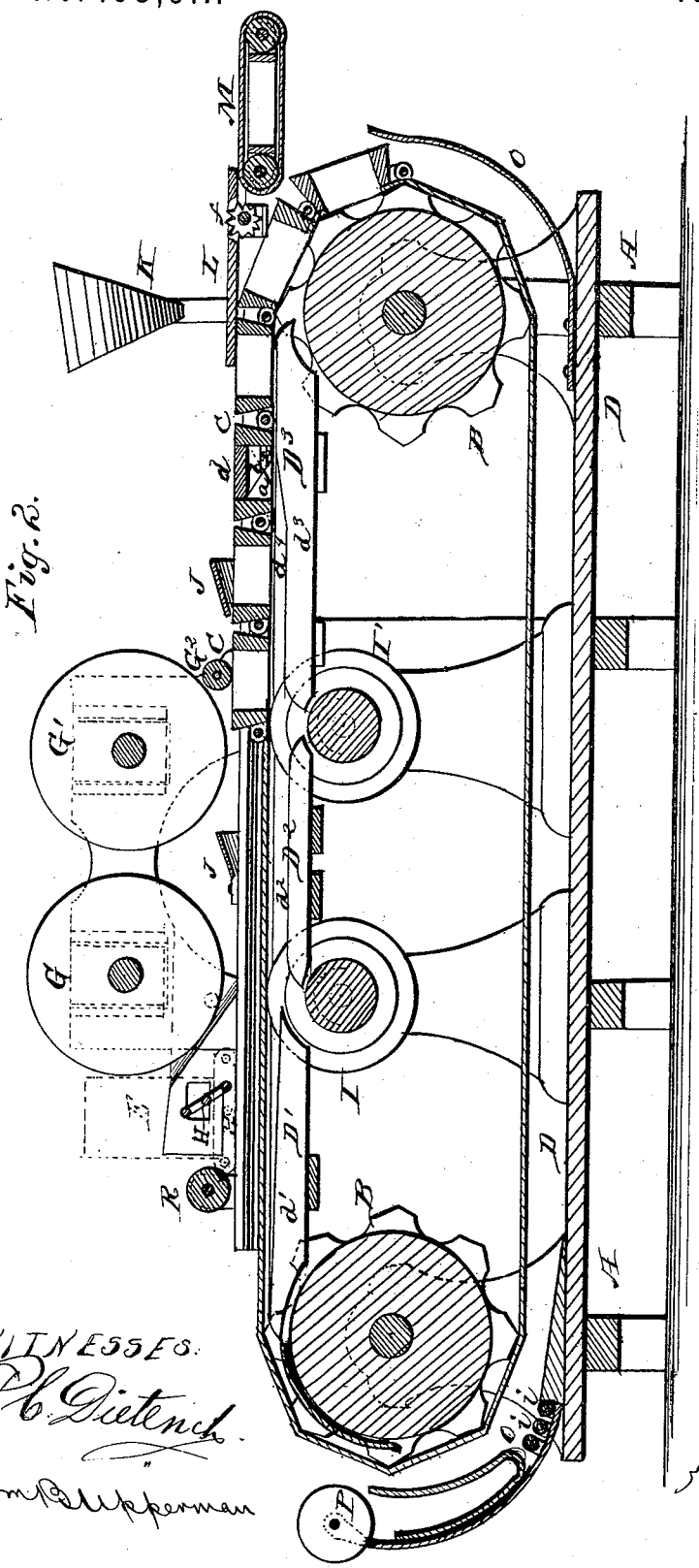

200~# UNITED STATES PATENT OFFICE.

SAMUEL MARTIN, OF KNOBNOSTER, MISSOURI.

IMPROVEMENT IN BRICK-MACHINES.

Specification forming part of Letters Patent No. 168,911, dated October 19, 1875; application filed October 2, 1875.

*To all whom it may concern:*

Be it known that I, SAMUEL MARTIN, of Knobnoster, in the county of Johnson and State of Missouri, have invented certain new and useful Improvements in Brick-Machines; and I do hereby declare that the following is a full, clear, and exact description thereof, which will enable others skilled in the art to which it appertains to make and use the same, reference being had to the accompanying drawings, and to the letters of reference marked thereon, which form part of this specification.

The nature of my invention consists in the construction and arrangement of a brick-machine, as will be hereinafter more fully set forth.

In the annexed drawings, Figure 1 is a plan view of my brick-machine. Fig. 2 is a longitudinal vertical section of the same. Figs. 3, 4, and 5 are detailed views of parts thereof.

A represents the frame of my machine constructed in any suitable manner to contain the various working parts thereof. At each end of the frame is an octagon pulley, B, around which passes an endless chain or belt of molds or mold-boxes C C, pivoted together through ears or projections extending from their ends. In each of these molds is placed a follower, $d$, provided on its under side, on each side, with an incline flange, $a$, and in the center with a flange, $b$, inclined in the opposite direction, this latter flange being at its lower end grooved or formed with a hook, as shown at $x$. The endless chain thus constructed is supported upon an upper and a lower tramway. The lower tramway D is made in one or more pieces, and level, while the upper tramway is made in three sections, $D^1$, $D^2$, and $D^3$. The first section $D^1$ is formed with descending inclines $d^1$ $d^1$; the second section $D^2$ is formed with ascending inclines $d^2$, and the third section $D^3$ is formed with ascending inclines $d^3$ and $d^4$, the sections having plane or level surfaces between the various inclines.

E is the hopper containing the clay, and under which is the shuttle-rack H. As each mold passes under the hopper the follower $d$, having previously been drawn down to the bottom of the mold by the descending inclines $d^1$, the mold is filled with clay, and as the mold advances by the revolution of the pulleys B it passes under a force-wheel, G, which forces the clay forward into the mold, the mold and follower being during this operation supported by a grooved wheel, I, which is situated between the two sections $D^1$ and $D^2$ of the upper tramway. As soon as the mold passes from under the wheel G an angular knife, J, firmly fastened to the frame, cuts any clay projecting above the mold. The mold continuing to advance, the follower is raised slightly by passing over the ascending inclines $d^2$, when the mold passes under a compress-roller $G^1$, pressing the clay into the mold, the mold and follower being during this operation supported upon a grooved counter compress-roller, $I'$. This last roller is situated between the two sections $D^2$ and $D^3$ of the upper tramway. As soon as the mold passes from under the compress-roller $G^1$ it moves under a friction-clamp roller, $G^2$, and at the same time the mold is raised by passing over the ascending inclines $d^3$, thus causing the roller $G^2$ to still further force the clay downward into the mold. After passing from under the roller $G^2$ any clay remaining above the edges of the mold is cut off by another angular knife, J, properly arranged. The mold now passes over the ascending inclines $d^4$, which are so arranged that, while they only slightly raise the mold itself, they raise the follower therein flush with the upper edges of the mold holding the molded brick on top thereof. While in this position the brick is sanded from a sand-hopper K. The brick is then deposited upon a receiving-plane, L, in which is a pitting-wheel, $f$, while the mold turns down around the pulley B at that end. From the receiving-plane the brick pass onto a carrying-off belt, M, from which they are moved by a friction-wheel, N, onto a receiving-board. At one end of the machine is a guide, O, with friction and dust-escape rollers $i$ $i$, which guide also cleanses the outer surfaces of the molds and followers. After the bricks have been taken from the molds, as above described, the molds pass around the outer side of that pulley, between it and the guide O, then along the lower tramway D, and up around the pulley at the front end. At the upper end of the guide O, at this end, is a spring roller or wheel, P, which forces the follower back into the mold. Before the mold again passes under the hopper it passes under a rigid guide-roller, R, which flexes the endless chain to its line of travel.

With a machine constructed on this principle clay may be rolled for building-brick, roofing, flooring, or drainage tiles, fencing material, posts, rails, and many other articles.

Having thus fully described my invention, what I claim as new, and desire to secure by Letters Patent, is—

1. In a brick-machine an endless chain composed of molds pivoted together, and each mold having a movable follower, in combination with pressure-rollers arranged in pairs above and below the molds, substantially as and for the purpose set forth.

2. In a brick-machine, having an endless revolving chain of molds, the combination of the force-wheel G, supporting-wheel I, and the compress and counter-compress rollers $G^1$ $I^1$, constructed and arranged substantially as and for the purposes herein set forth.

3. The grooved counter-compressing rollers I and $I'$, in combination with the molds C, pressure-rollers G and $G^1$, and sections $D^1$, $D^2$, and $D^3$, all constructed and arranged as and for the purpose set forth.

4. The spring wheel or roller P, arranged to operate on the followers in the molds, for the purposes set forth.

In testimony that I claim the foregoing as my own I affix my signature in presence of two witnesses.

SAML. MARTIN.

Witnesses:
 WM. B. UPPERMAN,
 C. H. WATSON.